United States Patent
Ammar et al.

(10) Patent No.: US 7,206,591 B2
(45) Date of Patent: Apr. 17, 2007

(54) TONELESS TELEMETRY IN A WIRELESS SYSTEM

(75) Inventors: Danny F. Ammar, Windermere, FL (US); Heung K. Tsang, Lake Mary, FL (US)

(73) Assignee: Xytrans, Inc., Orlando, FL (US)

( * ) Notice: Subject to any disclaimer, the term of this patent is extended or adjusted under 35 U.S.C. 154(b) by 315 days.

(21) Appl. No.: 10/918,652

(22) Filed: Aug. 12, 2004

(65) Prior Publication Data

US 2005/0048993 A1 Mar. 3, 2005

Related U.S. Application Data

(60) Provisional application No. 60/494,916, filed on Aug. 13, 2003.

(51) Int. Cl.
*H04H 1/00* (2006.01)
*H04B 7/00* (2006.01)

(52) U.S. Cl. .............. 455/502; 455/3.01; 455/3.04

(58) Field of Classification Search ............. 455/3.01, 455/3.02, 3.03, 3.04, 3.05, 12.1, 13.1, 133–137, 455/272–273, 278.1, 502; 375/219, 257
See application file for complete search history.

(56) References Cited

U.S. PATENT DOCUMENTS

| | | | |
|---|---|---|---|
| 5,754,949 A | 5/1998 | Kumagai et al. | 455/115 |
| 6,640,084 B2 | 10/2003 | Pande et al. | 455/3.01 |
| 6,731,946 B1 | 5/2004 | Stanwood et al. | 455/517 |
| 7,072,627 B2 * | 7/2006 | Coffin, III | 455/137 |
| 2003/0152140 A1 * | 8/2003 | Antoniak | 375/219 |
| 2003/0163820 A1 * | 8/2003 | Knutson et al. | 725/63 |
| 2003/0163821 A1 * | 8/2003 | Knutson et al. | 725/63 |
| 2003/0163822 A1 * | 8/2003 | Knutson et al. | 725/68 |
| 2003/0190902 A1 * | 10/2003 | Horie et al. | 455/272 |
| 2004/0092237 A1 | 5/2004 | Chen | 455/126 |

* cited by examiner

*Primary Examiner*—Sonny Trinh
(74) *Attorney, Agent, or Firm*—Allen, Dyer, Doppelt, Milbrath & Gilchrist, P.A.

(57) ABSTRACT

The present invention is directed to indoor/outdoor wireless communication systems and methods. Communications between an indoor unit and outdoor unit do not require telemetry tones. The input DC voltage level from the indoor unit is reduced to a level below the normal operating range for the outdoor unit. This is recognized by the outdoor unit as a signal to start receiving telemetry data, which is sent from the indoor unit to the outdoor unit by modulating the transmit signal.

25 Claims, 7 Drawing Sheets

- FORMAT
    START (8BITS)- ADDRESS (8BITS)- VALUE (8BITS)- STOP (8BITS) (32 BITS)
- START SEQUENCE                                    10101110
- ADDRESSES
    SET        IF                              0000
               HPA GATE                        0001
               AMP1 GATE                       0010
               AMP2 GATE                       0011
               AMP3 GATE                       0100
               GAIN SLOPE FOR                  0101
               GAIN SLOPE FOR                  0110
               SERIAL                          0111
        READ BACK TABLES THROUGH DC            1000
        RUN PROGRAM CODE                       1001
- VALUES    8 BIT
- STOP                                         10100001

FIG. 7

- FORMAT:
    START (8) - [INPUT VALUES (8)]x8 - TEMP(8) - IF DETECTOR VALUE(8) - 6V MON(8) - 4V MON(8) - SerNo(8) - CHECKSUM(8) - STOP(8)
- START SEQUENCE:         1010 1110

- VALUES:         (8 BIT VALUES)

- STOP SEQUENCE:         1010 0001
- TOTAL BIT TRANSFER = 128 BITS @ 100Hz = 1.28 SEC

- AMPLIFIER DC WILL BE MODULATED BETWEEN CURRENT TABLE VALUE AND -1V TO PROVIDE PULSING OUTPUT

- NOTE: NO ADDRESSING NEEDED

*FIG. 8*

TONELESS TELEMETRY IN A WIRELESS SYSTEM

RELATED APPLICATION

This application is based upon prior filed copending provisional application Ser. No. 60/494,916 filed Aug. 13, 2003.

FIELD OF THE INVENTION

This invention relates to the field of wireless communication systems using indoor and outdoor units, and more particularly, this invention relates to communication systems having telemetry communications between an indoor unit and outdoor unit in wireless terrestrial and VSAT applications.

BACKGROUND OF THE INVENTION

Indoor units (IDU) and outdoor units (ODU) are commonly used in wireless terrestrial and very small aperture terminal (VSAT) communication systems or networks. These VSAT systems are cost-effective communication networks that allow many smaller VSAT terminals to be geographically dispersed and located in many different areas, including rural and metropolitan areas. VSAT networks support internet, voice/fax, data, LAN and many other communication formats.

A VSAT network usually includes a large central earth station known as a central hub (or master earth station), a satellite transponder, and a large number of geographically disbursed, remote VSATs. The satellites are positioned in a geostationary orbit about 36,000 kilometers above the earth. A VSAT terminal receives and transmits signals via the satellite to other VSATs in the network. The term "very small" used in the VSAT name refers to the small antenna dish that typically is about 3 to about 6 feet in diameter and could be mounted in almost any location, such as a roof, building wall, or on the ground. The VSAT terminal has an outdoor unit (ODU) that includes an antenna, low noise blocker (LSB) in some instances, and a VSAT transceiver as part of the outdoor electronics and other components. The antenna usually includes an antenna reflector, feed horn and an antenna mount or frame. The outdoor electronics constitute part of the outdoor unit and include low noise amplifiers (LNA) and other transceiver components, such as a millimeter wave (MMW) transceiver.

The indoor unit (IDU) can be an interface, such as a desktop box or PC, that contains the electronics for interfacing and communicating with existing in-house equipment such as local area networks, servers, PCs and other equipment. The indoor unit is usually connected to the outdoor unit with a pair of cables, e.g., coaxial cable. Indoor units also include basic demodulators and modulators.

The use of millimeter wave (MMW) frequency bands allows wireless links to produce up to about an estimated 1,000 times the data capacity of digital subscriber loop (DSL) or cable modems, systems and offer a higher bandwidth and available at lower operating frequencies. Many terrestrial wireless systems are built using point-to-point, point-to-multipoint, local multipoint distribution services (LMDS), and mesh architectures. Each link end also contains the indoor unit and an outdoor unit. Commonly assigned U.S. published patent application no. 2003/0152140 to Antoniak, the disclosure which is hereby incorporated by reference in its entirety, discloses a new method and system of multiplexing complex digital data signals under the same cable as high frequency IF signals without interference. Telemetry control signals are transmitted and received with intermediate (IF) payload data and DC signals on a common cable between an indoor unit and an outdoor unit. A carrier signal can be modulated with telemetry control signals to represent serial data bits by switching ON and OFF a carrier tone for ON/OFF keying and forming a modulated signal.

In these systems that use indoor units and outdoor units, typically the transmit and receive data can be at an intermediate frequency and typically ranges from a few hundred MHz to few GHz. The telemetry tones are usually at much lower frequencies. In order for the indoor unit to communicate with the outdoor unit, a telemetry tone ranging from a few KHz to many MHz is required. Various types of modulation techniques have been used to code this telemetry signal stream. Some of the techniques include FSK (frequency shift keying) and OOK (ON/OFF keying), such as described in the incorporated by reference '140 published patent application. In cases where a full duplex is required between the indoor unit and the outdoor unit, two (2) tones will be required. One tone is used to send telemetry data from the indoor unit to the outdoor unit and one tone is used for sending data from the outdoor unit to the indoor unit. In addition to the added cost of the circuitry required to generate these telemetry tones, spurs could be created at the output of the transmitter and receiver. These spurs are challenging and difficult to filter.

SUMMARY OF THE INVENTION

The present invention provides a system and method of communicating between the indoor unit and the outdoor unit without requiring telemetry tones, thereby simplifying the indoor unit and outdoor unit circuits and reducing overall cost of the system.

The present invention provides an indoor/outdoor wireless communication system (typically referred to as a split system) that does not require telemetry tones to transfer command and status information between the indoor unit and the outdoor unit. Some of the benefits of the present invention are achieved by reducing the input DC voltage level from the indoor unit to a level below the normal operating range for the outdoor unit, which is recognized by the outdoor unit as a signal to start receiving data, such as telemetry data. The telemetry data is sent from the indoor unit to the outdoor unit by modulating the transmit signal. During the data transfer, a transmitter final stage amplifier is turned-off to transfer the data.

The present invention also provides a system and method of turning the transmitter ON/OFF in the outdoor unit without requiring a telemetry tone. This is achieved by having the outdoor unit sense the level of the transmit signal from the indoor unit. If the transmit signal from the indoor unit is not present, the outdoor unit will turn off the transmitter to reduce the amount of dissipated DC power and temperature rise in the outdoor unit. The outdoor unit modulates the amount of current draw by pulsing the amplifiers in the outdoor unit. The indoor unit interprets these messages by sensing the modulation of outdoor unit as the current draw.

Sensing in the outdoor unit can be accomplished using a detector that receives a transmit intermediate frequency.

BRIEF DESCRIPTION OF THE DRAWINGS

Other objects, features and advantages of the present invention will become apparent from the detailed description of the invention which follows, when considered in light of the accompanying drawings in which:

FIG. 7 is a table illustrating an example of indoor unit to outdoor unit input instructions that can be used with the present invention.

FIG. 8 is a table indicating an example of outdoor unit to indoor unit output instructions that can be used with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
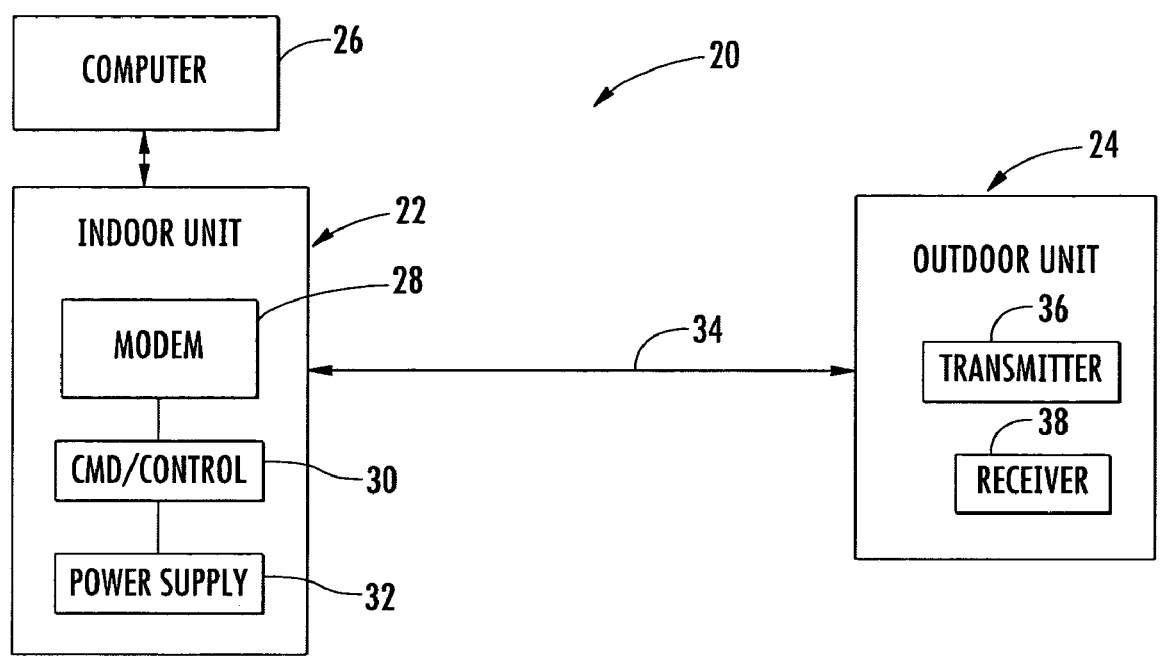
FIG. 1 is a block diagram of a prior art VSAT indoor/outdoor unit interface that uses a coax cable.

A prior art wireless communication system is shown in FIG. 1 at 20 and includes an indoor unit (IDU) 22 and an outdoor unit (ODU) 24. As illustrated, the indoor unit 22 is connected to a computer 26, for example, a personal computer as one non-limiting example. The indoor unit 22 includes a modem 28, a command/control circuit 30, and a power supply 32. The indoor unit 22 connects by coaxial cable 34 to the outdoor unit 24, which includes a transmitter 36 and receiver 38. The coaxial cable 34 provides an interface between the indoor unit 22 and the outdoor unit 24. As known to those skilled in the art, the transmit intermediate frequency (IF) signals, receive IF signals, DC signals and command and control signals are transmitted and received over the coaxial cable. This can include all transmit data, receive data, and telemetry data as known to those skilled in the art.

Figure 2A:
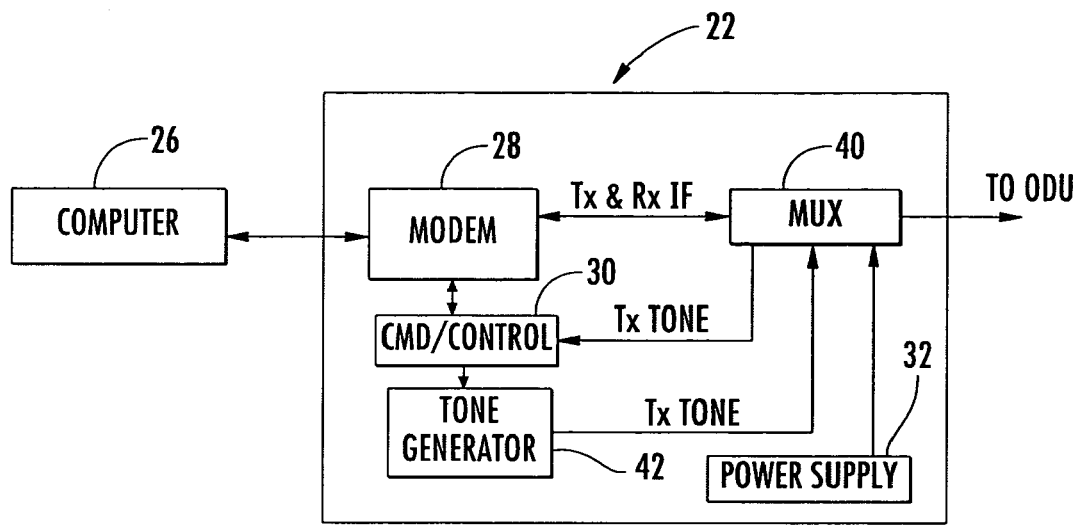
FIGS. 2A and 2B are respective block diagrams of prior art indoor and outdoor units.

This prior art indoor unit 22 is shown in greater detail in FIG. 2A and includes the modem 28, a diplexer 40, including a multiplexer (mux) circuit, the power supply 32, the command and control circuit 30, and telemetry circuits 42, for example, a tone generator that can be included in this specific prior art example. The modem 28 communicates with the computer 26 and receives the transmit and receive intermediate frequency (IF) signals. The command/control circuitry 30 receives transmit tone signals from the multiplexer 40, which had received transmit tones from the tone generator 42. These circuits allow the indoor unit 22 to communicate with the ODU 24. The indoor unit is usually connected to the computer 26 or other network or user interface.

Figure 2B:
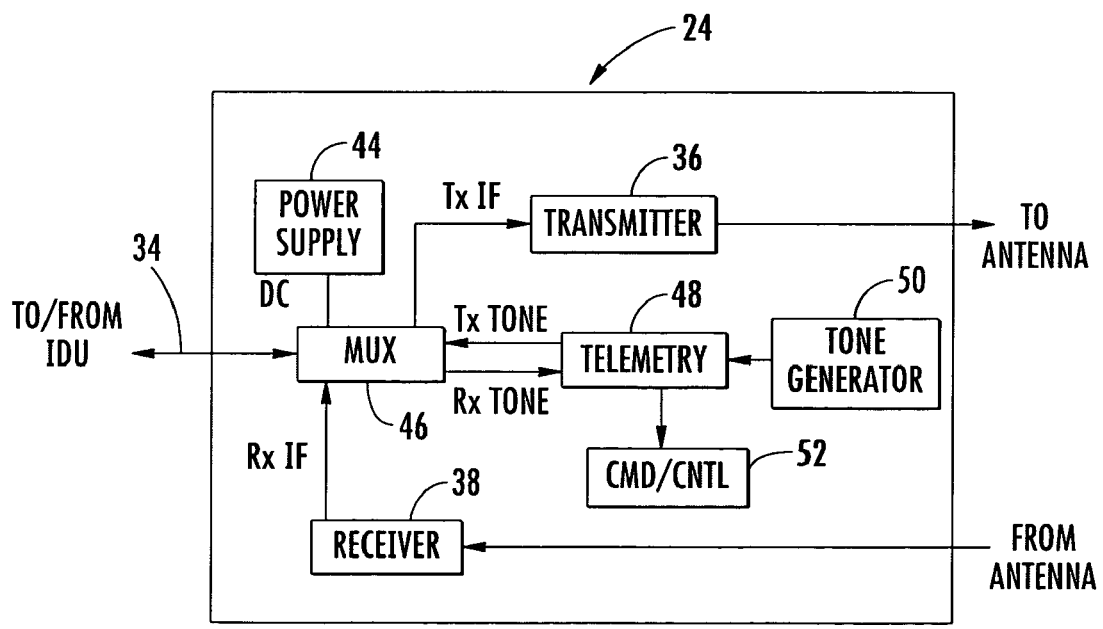

The prior art outdoor unit 24 is shown in FIG. 2B and is typically connected to the indoor unit 22 using a single coaxial cable 34 that carries the signals as described before, including transmit data, the receive data and the telemetry data. As shown in FIG. 2B, the outdoor unit 24 includes a power supply 44 connected to a multiplexer circuit 46. This circuit 46 receives and transmits tones to and from the telemetry circuit 48, which is operative with a tone generator circuit 50. The command/control circuit 52 interfaces with the telemetry circuit 48. The transmitter 36 transmits a signal through an antenna, while the receiver 38 receives a signal from an antenna. The multiplexer 46 receives and transmits respective receiver and transmitter IF signals, as known to those skilled in the art.

Figure 3:
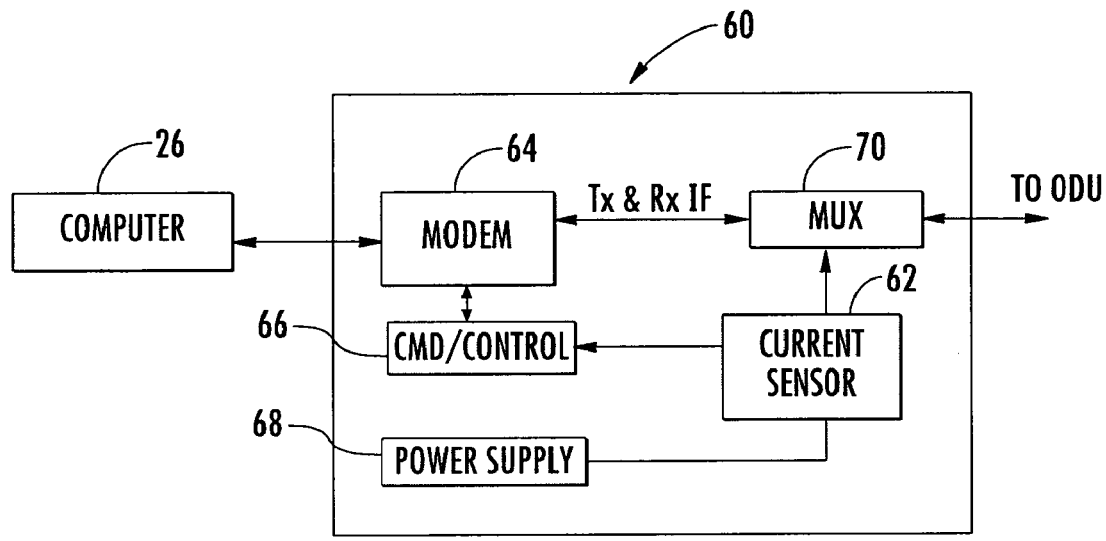
FIG. 3 is a block diagram of the indoor unit of the present invention.

FIG. 3 is a block diagram of the indoor unit 60 of the present invention. The indoor unit 60 of the present invention does not include the telemetry tone circuits usually found in a traditional prior art indoor unit, such as shown in FIGS. 1 and 2A. In one aspect of the present invention, a simple low cost current sensor circuit 62 replaces the more expensive telemetry circuits. The function of this current sensor will be explained in greater detail below. As illustrated, the indoor unit 60 of the present invention includes a modem 64 that interfaces a computer 26 as in FIG. 1, a command/control circuit 66, a power supply 68 and a multiplexer circuit 70 with functionality as explained before. The current sensor circuit 62 replaces the telemetry circuit shown in FIG. 2A.

Figure 4:
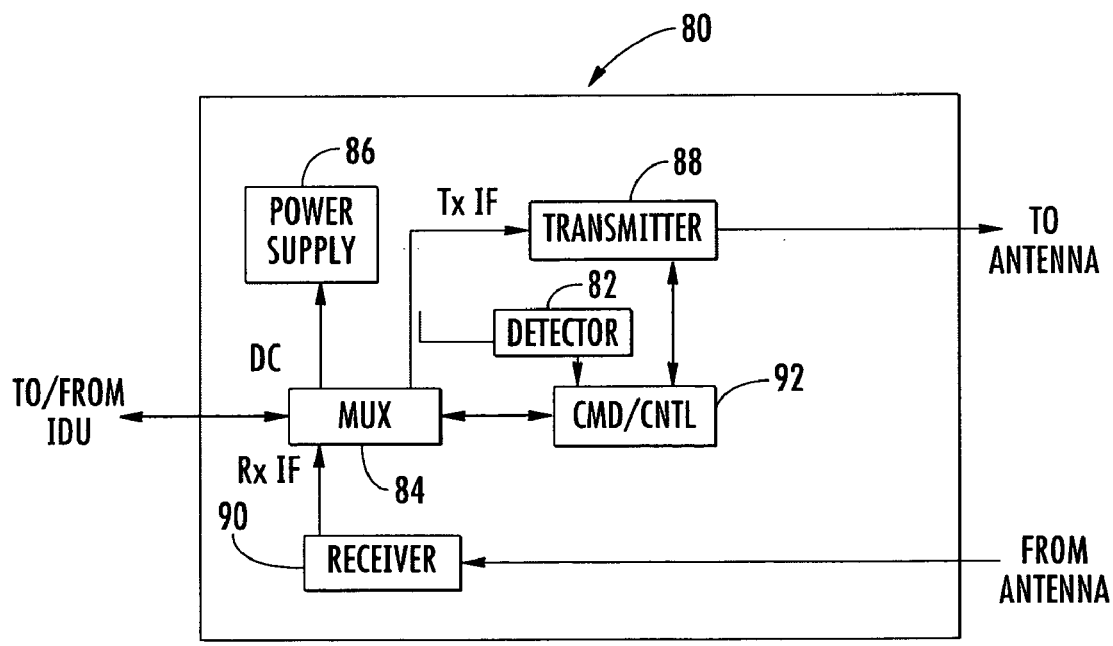
FIG. 4 is a block diagram of the outdoor unit of the present invention.

FIG. 4 is a block diagram of the outdoor unit 80 of the present invention. The outdoor unit 80 of the present invention does not include telemetry tone circuits as found in traditional prior art outdoor units, such as shown in FIG. 2B. A simple, low cost transmit Intermediate Frequency (IF) signal detector 82 replaces the more expensive telemetry circuits used in the prior art systems. As illustrated, the outdoor unit 80 of the present invention includes a multiplexer 84, a power supply 86, a transmitter 88 and a receiver 90, and a command/control circuit 92 operative with the detector 82, which is coupled to receive a signal from the multiplexer 84, e.g., the transmit Intermediate Frequency (IF) signal.

Figure 5:
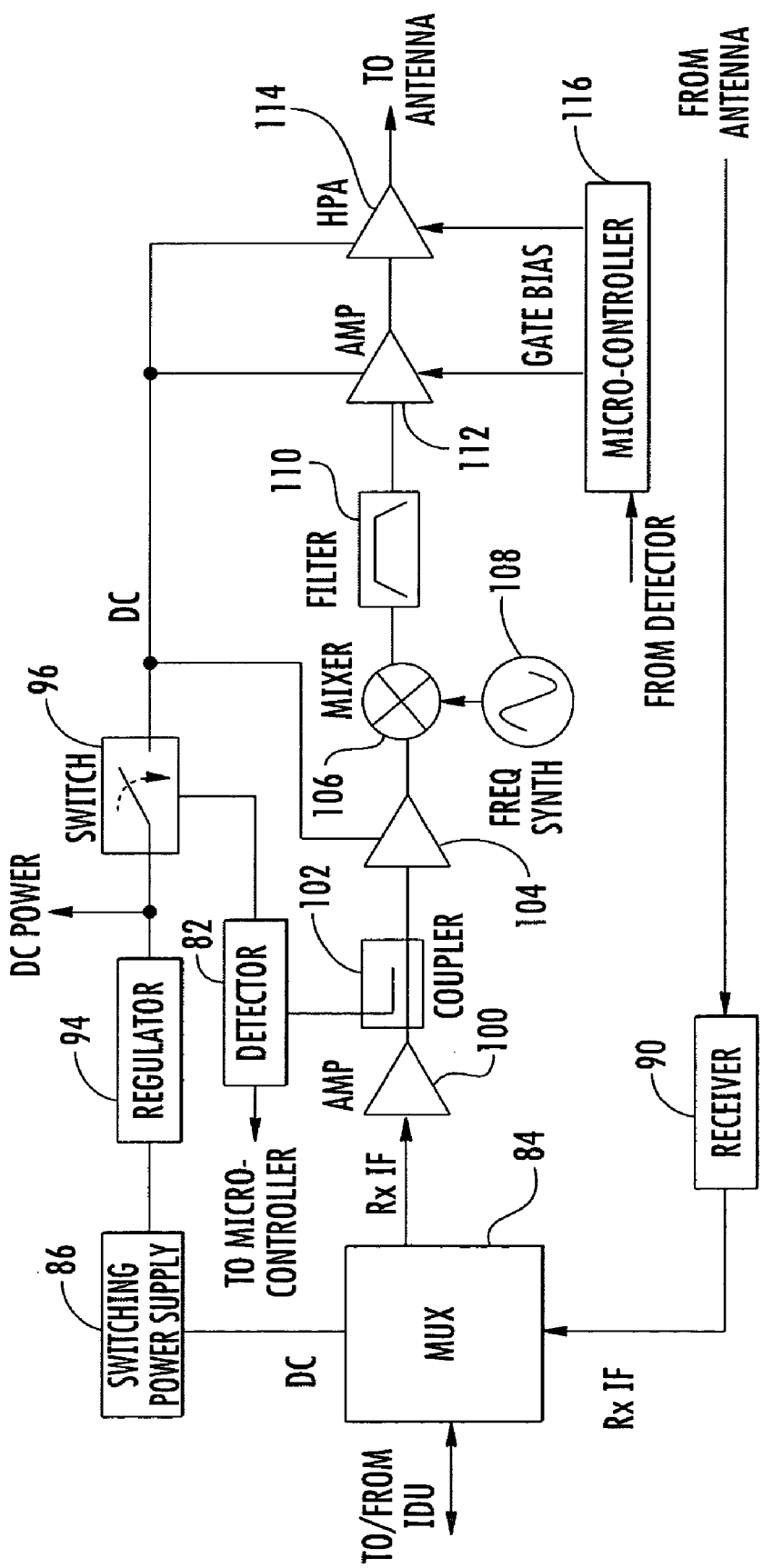
FIG. 5 is a more detailed, schematic circuit block diagram of the outdoor unit of the present invention.

FIG. 5 is a more detailed schematic circuit, block diagram of the outdoor unit 80 shown in FIG. 4. As noted before, the receiver 90 receives signals from an antenna. The receiver 90 transmits a receive Intermediate Frequency (IF) signal to the multiplexer 84. The multiplexer 84 is powered by a switching power supply 86 in this non-limiting example, which is connected to a regulator circuit 94 to aid in regulating DC power and aid in controlling a switch 96 that is operatively connected to the IF signal detector 82.

The multiplexer 84 also sends a receive Intermediate Frequency (IF) signal through an amplifier 100, which outputs the amplified signal to a coupler 102 that is coupled to the IF signal detector 82. The signal from the switch 96 is split, with a portion of the signal input into an amplifier/comparator 104 that receives an output signal from the coupler 102. The amplifier/comparator 104 outputs a signal to a mixer 106, which also receives a generated signal from a frequency synthesizer 108. The signal that is output from the mixer 106 is filtered by a preferred bandpass filter 110 (although it is possible to use other types of filters) and amplified by a driver amplifier 112 and high power amplifier (HPA) 114, each having their gate bias controlled by a microcontroller 116 in this particular example. The microcontroller 116 receives a signal from the detector 82, as illustrated.

Referring again to FIGS. 3–5, transmit data and DC voltage signals are sent from the indoor unit 60 to the outdoor unit 80 using a coaxial cable 34 in this illustrated embodiment. The receive data is at a different Intermediate Frequency (IF) than the transmit data, and is sent from the outdoor unit to the indoor unit on the same coaxial cable. The multiplexer 84 in the outdoor unit, operative with a diplexer function, separates the transmit/receive and DC signals and routes them through the appropriate path. The coupler 102 (FIG. 5) couples some of the transmit IF signals, typically at a few 100 MHz, into the detector chip 102 (for example, an analog devices AD8362 or an equivalent chip as a non-limiting example), which senses the level of the transmit signal.

The AD8362 chip can be used as a detector 82, and is a radio frequency integrated circuit (RF IC) designed to measure complex modulated waveforms. This type of circuit performs a precise root-mean-square (RMS) power level measurement, providing a user with an accurately-scaled, linear-in-dB output voltage, which could be critical in maintaining base station output power efficiency and spectrum signal purity. These measurements can be used with next generation cellular base stations employing 3G Code Division Multiple Access (CDMA), wideband-CDMA, and 2.5G enhanced data rate for GSM evolution (EDGE). This circuit also offers accurately-scaled, linear-in-dB output, which simplifies its use within wireless infrastructure equipment. In addition, this chip is specified for operation up to 2.7 GHz.

The AD8362 chip can measure instantaneously the continuously-variable crest factor signals found within CDMA, W-CDMA, 8-PSK, WAM and OFDM signals, the AD8362 targets IS95, CDMA2000, 3GPP, GSM Edge, MMDS and other broadband access equipment. Applications include cellular base station transmit power level control, receiver signal strength indication (RSSI), single and multi-carrier power amplifier linearization/control loops, point to multipoint broadband access, point-to-point high capacity QAM radio links, cellular repeaters, RF instrumentation equipment, and other applications.

This chip offers in excess of 60 dB measurement range, from −45 dBm to +15 dBm, within 50 ohms system. The device is internally factory-trimmed to provide a 50 mV/dB output voltage scaling, error correction and a precision internal bias circuit, which ensures excellent accuracy and temperature stability over the full dynamic range. The AD8362 chip can operate off a single 5V supply. It consumes a modest 19 mA of quiescent current and is fully specified for operation from −45 to +85 degrees Celsius.

In accordance with the present invention, the transmit IF signal is amplified and up-converted to a higher frequency using a local Oscillator (LO) signal typically generated through a voltage controlled oscillator (VCO) or a dielectric resonator oscillator (DRO) as the frequency synthesizer 108 and input into the mixer 106. The up-converted signal is filtered by the bandpass filter 110 and amplified using the driver amplifier 112 and the high power amplifier (HPA) 114. The output of the high power amplifier is sent to an antenna for transmission. Typically, the transmitter has about 55 dB of gain and outputs a signal of about 34 dBm. Thus, the input power level is required to be about −19 dBm. The detector 82 is set to "turn-on" the DC switch to power-up the amplifier when the IF input signal is above −25 dBm. When the IF signal is removed, the transmit amplifier shuts down completely.

This circuit of the present invention provides many benefits. For example, this circuit eliminates the requirement for a telemetry signal to turn ON/OFF the transmitter. It also reduces heat by turning any amplifiers OFF when there is no IF signal present and eliminates unnecessary broadcasting of transmit noise. The DC switch can be a high-speed switch that turns the high power amplifier ON and OFF within less than 2 microseconds (usec). The receiver section of the outdoor unit would use a low noise block (LNB) circuit.

In addition to turning the transmitter amplifier ON/OFF, the detector circuit 82 is used to communicate between the indoor unit 60 and the outdoor unit 80 of the present invention. When the indoor unit 60 is required to send command data, such as when requesting status data, the indoor unit 60 reduces the DC voltage from its nominal range of about 24 to 36 volts (V) to about 15 V. This drop in voltage signals to the outdoor unit 80 to start receiving telemetry data. The telemetry data is sent by modulating the normal transmit IF signal ON/OFF into a binary signal set. The detector decodes the signal into a set of binary 1's and 0's and sends them to the microcontroller 116, which interprets the signals sent by the indoor unit into specific commands. The high power amplifier 114 is turned off during the telemetry data transfer to prevent transmission of these signals, which are only intended to communicate between the indoor unit 60 and the outdoor unit 80.

The microcontroller 116 sends a status signal back to the indoor unit 60 by modulating the DC current drawn by the high power amplifier 114 in a quiescent state (i.e., when no RF input applied). This is achieved by modulating the gate bias of the high power amplifier 114, which could include a Field Effect Transistor (FET). The amount of DC current the high power amplifier 114 draws is directly proportional to the gate bias level. Therefore, by modulating the gate bias, the current is pulsed ON and OFF to create a set of binary sequences (messages). The pulsing of the current drawn by the outdoor unit 80 is sensed in the indoor unit 60 using the current sensor 62 in the indoor unit.

The following is an example of the high power amplifier gate bias voltage versus drain current.

| Gate Voltage | Drain Current |
| --- | --- |
| −400 mV | 2.0 amp |
| −1000 Mv | <0.1 amp |

Figure 6:
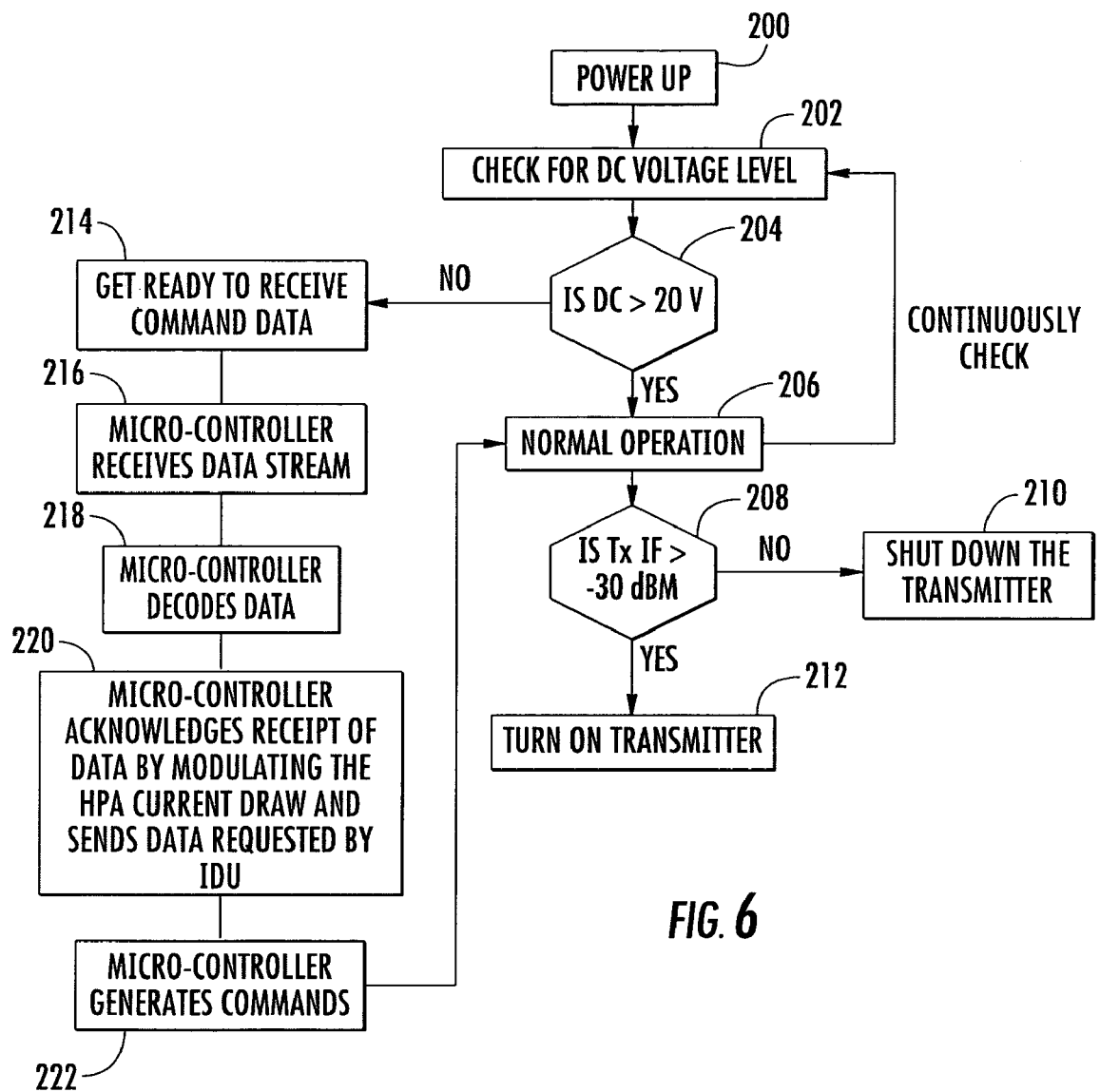
FIG. 6 is a flowchart illustrating an example of the sequence of operation for the outdoor unit.

FIG. 6 is a flowchart illustrating one example of a sequence of events that enables telemetry data transfer between the indoor unit and the outdoor unit.

The microcontroller constantly monitors the input voltage from the indoor unit by checking the DC voltage level (block 202). If the DC voltage is less than 20 V (block 204), the unit will continue to operate under normal conditions (block 206) (i.e., up convert and amplify the transmit signal from the indoor unit). Even under normal operating conditions, the outdoor unit will continue to monitor the transmit signal input power from the indoor unit. It also determines if the transmit IF is greater than −30 dBm (block 208). If the input power falls below −30 dBm (which is 10 dB below the minimum input power required to transmit), the outdoor unit will shut down the DC power to the amplifiers in the transmit chain, and thus, shut down the transmitter (block 210). This will allow the unit to perform thermal management and will result in much longer amplifier reliability. Otherwise, the transmitter is turned on (block 212).

In the case where the outdoor unit senses an input voltage that is less than 20 units, for example, of about 15 Volts, the outdoor unit will transition into a message receive mode to receive command data (block 214). The microcontroller will receive a data stream and a set of binary messages (block 216), which are interpreted as specific commands from the indoor unit. The microcontroller decodes the data (block 218) and acknowledges receipt of data by modulating the high power amplifier current draw and sends data requested by the indoor unit (block 220). The microcontroller then generates commands (block 222). After receipt of the messages, the outdoor unit sends an acknowledgement of receipt of those messages. This task is accomplished by modulating the high power amplifier current draw through modulation of the gate bias. During this modulation, there is no transmission. The high power amplifier current is modulated while in a quiescent state. To ensure that no RF energy is transmitted during this cycle, the driver amplifier is pinched-off completely, blocking any RF energy from reaching the HPA input.

FIG. 7 is a table showing an example of the type of data transfer that can occur between the indoor unit and the outdoor unit. The message includes a start sequence, which the outdoor unit microcontroller will look for to signal the start of a command sequence. The start sequence is followed by a number of commands dealing with the specific set-up of the outdoor unit circuits, including attenuators, amplifiers, and related circuits and components. After the commands are sent, the indoor unit sends a stop sequence, which confirms the end of the telemetry transfer.

An example of indoor unit to outdoor unit input instructions could have a format of 8 bits for the start and 8 bits for the address. The value could be 8 bits and the stop could be 8 bits. This gives a total of 32 bits. For example, a start sequence could be 10101110, as one non-limiting example. The addresses could be set for the intermediate frequency, the gate of the high powered amplifier, the gates of other amplifiers, and a gain slope in serial with read back tables through the DC. A run program code could have a value.

FIG. 8 is a table showing an example of messages sent back from the outdoor unit to the indoor unit using a DC current modulation scheme of the present invention. The indoor unit could request a specific value, and the outdoor unit would provide the requested value. The indoor unit senses the returned value, just by monitoring the current sensor inside the indoor unit.

FIG. 8 als shows an example of the outdoor unit to indoor unit output instructions where the format could be 8 bits for the start, input values of 8×8, and temporary, intermediate frequency detector values using various voltages with checksums and stops. Eight bit values could be included with a stop sequence with a total bit transfer of about 128 bits at 1,000 Hz at about 1.28 seconds. Amplified DC could be modulated between the current table value and −1 volt, as one non-limiting example, to provide a pulsing output. No addressing would be required in this non-limiting example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communication system comprising:
an indoor unit;
an outdoor unit in communication with the indoor unit, wherein the indoor unit is operative for transmitting a signal to the outdoor unit at a reduced DC voltage level below a normal operating range for the outdoor unit as signal recognized by the outdoor unit to begin receiving data, wherein the outdoor unit further comprises a transmitter, a detector circuit for detecting the level of a signal between the indoor unit and outdoor unit, and a switch operative with the detector circuit and the transmitter for shutting down the transmitter for receiving data.

2. A wireless communication system according to claim 1, and further comprising a coaxial cable interconnecting the indoor unit and outdoor unit over which transmit data and receive data to and from the indoor unit and outdoor unit pass.

3. A wireless communication system according to claim 2, wherein the transmit data and receive data are at two different intermediate frequencies.

4. A wireless communication system according to claim 1, wherein the data comprises telemetry data.

5. A wireless communication system according to claim 1, wherein the transmitter in the outdoor unit further comprises an amplifier and the switch is operative for shutting down the amplifier.

6. A wireless communication system according to claim 5, and further comprising a processor operative with the amplifier for adjusting gate bias thereon.

7. A wireless communication system according to claim 1, wherein the outdoor unit is operative for modulating current draw, and said indoor unit comprises a current sensor that detects the modulating current draw as a binary sequence of messages.

8. A wireless communication system comprising:
an indoor unit;
an outdoor unit in communication with the indoor unit, wherein the indoor unit is operative for transmitting a signal to the outdoor unit at a reduced DC voltage level below a normal operating range for the outdoor unit, said outdoor unit further comprising a transmitter, a detector circuit for detecting the level of the signal between the indoor unit and outdoor unit, and a switch operative with the detector circuit and the transmitter for shutting down the transmitter for receiving the data when a reduced DC voltage signal level is sensed by the detector circuit.

9. A wireless communication system according to claim 8, and further comprising a coaxial cable interconnecting the indoor unit and outdoor unit over which transmit data and receive data to and from the indoor unit and outdoor unit pass.

10. A wireless communication system according to claim 9, wherein the transmit data and receive data are at two different intermediate frequencies.

11. A wireless communication system according to claim 8, wherein the data comprises telemetry data.

12. A wireless communication system according to claim 8, wherein the transmitter in the outdoor unit further comprises an amplifier, wherein said switch is operative for shutting down the amplifier.

13. A wireless communication system according to claim 12, and further comprising a processor operative with the amplifier for adjusting gate bias thereon.

14. A wireless communication system according to claim 8, wherein the outdoor unit is operative for modulating current draw, and said indoor unit comprises a current sensor that detects the modulating current draw as a binary sequence of messages.

15. A method of communicating between an indoor unit and outdoor in a wireless communication system, which comprises:
   reducing an input DC voltage level from the indoor unit to a level below a normal operating range for the outdoor unit as a signal recognized by the outdoor unit to begin receiving data; and
   modulating current draw by pulsing an amplifier within the outdoor unit and sensing the modulating current draw within the current sensor as a binary sequence of messages.

16. A method according to claim 15, which further comprises receiving telemetry data after reducing the input DC voltage level.

17. A method according to claim 15, which further comprises sending data from the indoor unit to the outdoor unit by modulating a transmit signal.

18. A method according to claim 15, which further comprises turning off a transmitter in the outdoor unit for receiving the data.

19. A method according to claim 18, which further comprises turning off an amplifier within the outdoor unit for receiving the data.

20. A method of communicating between an indoor unit and outdoor in a wireless communication system, which comprises:
   reducing an input DC voltage level from the indoor unit to a level below a normal operating range for the outdoor unit;
   sensing within the outdoor unit the level of the signal from the indoor unit as a signal recognized by the outdoor unit to begin receiving data;
   turning off a transmitter in the outdoor unit when receiving data; and
   sensing the signal using a detector within the outdoor unit that receives a transmit intermediate frequency and generating a signal to a processor for controlling an amplifier in the transmitter of the outdoor unit.

21. A method according to claim 20, which further comprises turning off a transmitter within the outdoor unit if a transmit signal from the indoor unit is not present to reduce dissipated DC power and temperature rise within the outdoor unit.

22. A method according to claim 20, which further comprises controlling gate bias on the amplifier.

23. A method according to claim 20, which further comprises receiving telemetry data after reducing the input DC voltage level.

24. A method according to claim 20, which further comprises sending data from the indoor unit to the outdoor unit by modulating a transmit signal.

25. A method according to claim 20, which further comprises modulating current draw by pulsing an amplifier within the outdoor unit and sensing the modulating current draw within the current sensor as a binary sequence of messages.

* * * * *